ERROR STORE AND RESET CIRCUIT

Filed Dec. 21, 1959 2 Sheets-Sheet 1

INVENTORS
Miles C. Johnson
Thomas J. Burke

BY Q. Baxter Warner
Claude Funkhouser
ATTORNEYS

ERROR STORE AND RESET CIRCUIT

Filed Dec. 21, 1959 2 Sheets-Sheet 2

INVENTORS
Miles C. Johnson
Thomas J. Burke

BY O. Barton Warner
Claude Funkhouser
ATTORNEYS

United States Patent Office 3,046,524

Patented July 24, 1962

3,046,524
ERROR STORE AND RESET CIRCUIT

Miles C. Johnson, Mount Holly, and Thomas J. Burke, Westmont, N.J., assignors, by mesne assignments, to the United States of America as represented by the Secretary of the Navy Filed Dec. 21, 1959, Ser. No. 861,156
3 Claims. (Cl. 340—147)

This invention relates to error sampling systems and more particularly to an apparatus for sampling and storing periodic error indications.

In a typical error indicating system, signals in error are received sequentially on a single line for local error detection and display. For example, sequence signals on an input line may represent a plurality of input target data for a military defense system. Errors are sequentially detected in such data and caused to produce an indication or alarm.

When such error signals are received sequentially and periodically, it is desirable to have a local semi-permanent representation of such errors. It would also be desirable to register the occurrence of such errors permanently at the receiving point until such time as new and correct data is received.

In accordance with a feature of the present invention, sequentially received errors are detected and such detection is caused to operate a two-way switching device after a small time delay. A plurality of error-storing polarized relays are selected by a multiple position switch operated in synchronism with said input signals; this switch successively couples selected relays to a source of operating voltage through said two-way switching device. An error will be stored semi-permanently in the polarized relay until the multiple position switch returns in sequence back to the particular error position, whereupon the particular polarized relay is first re-set and, if an error is still present, the polarized relay is reoperated.

It is an object of the present invention to provide an improved error store and re-set circuit.

It is another object of this invention to provide an improved circuit for storing sequentially received errors in a plurality of two-position devices.

It is a further object of this invention to provide an improved apparatus for storing periodically-received error signals with an intermediate period of re-setting just prior to their recurrence.

Figure 1:
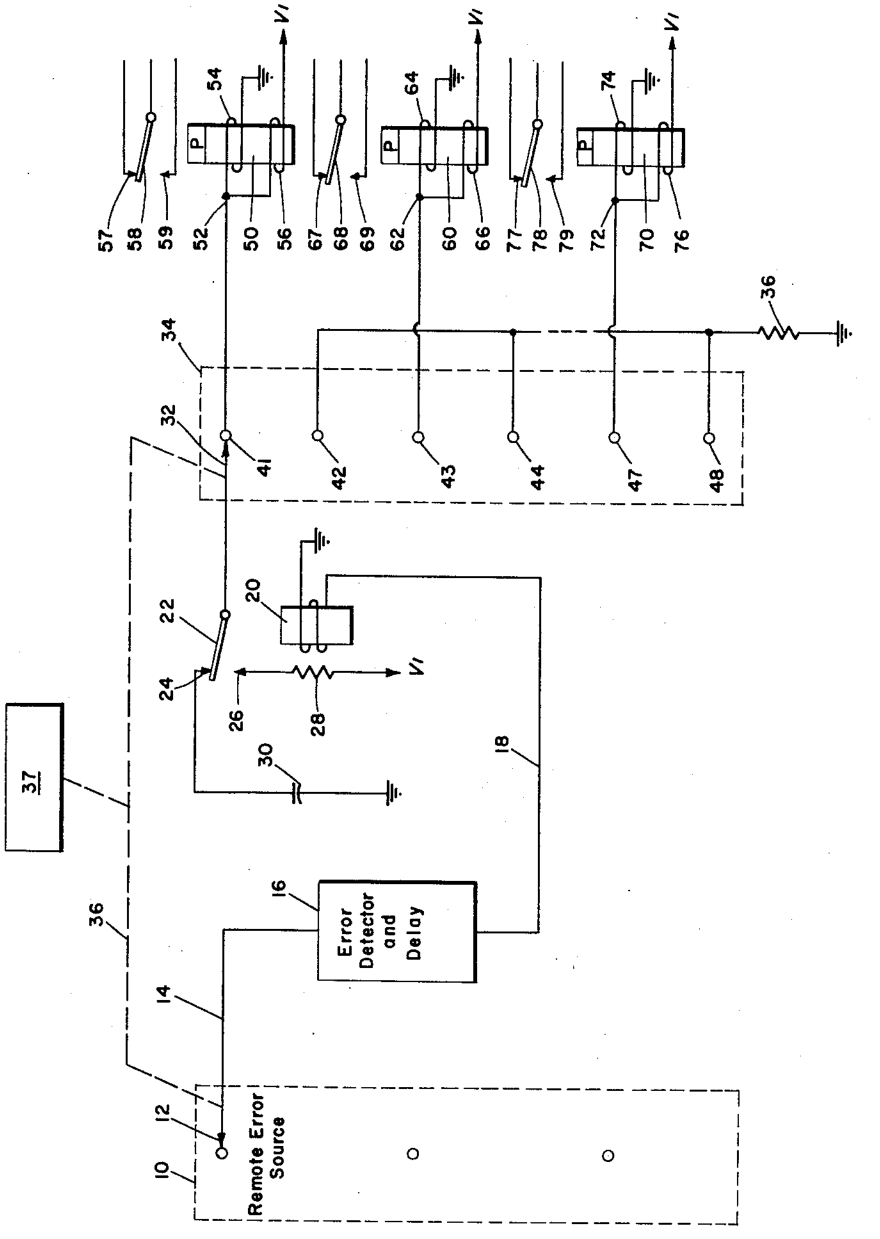
Figure 2:
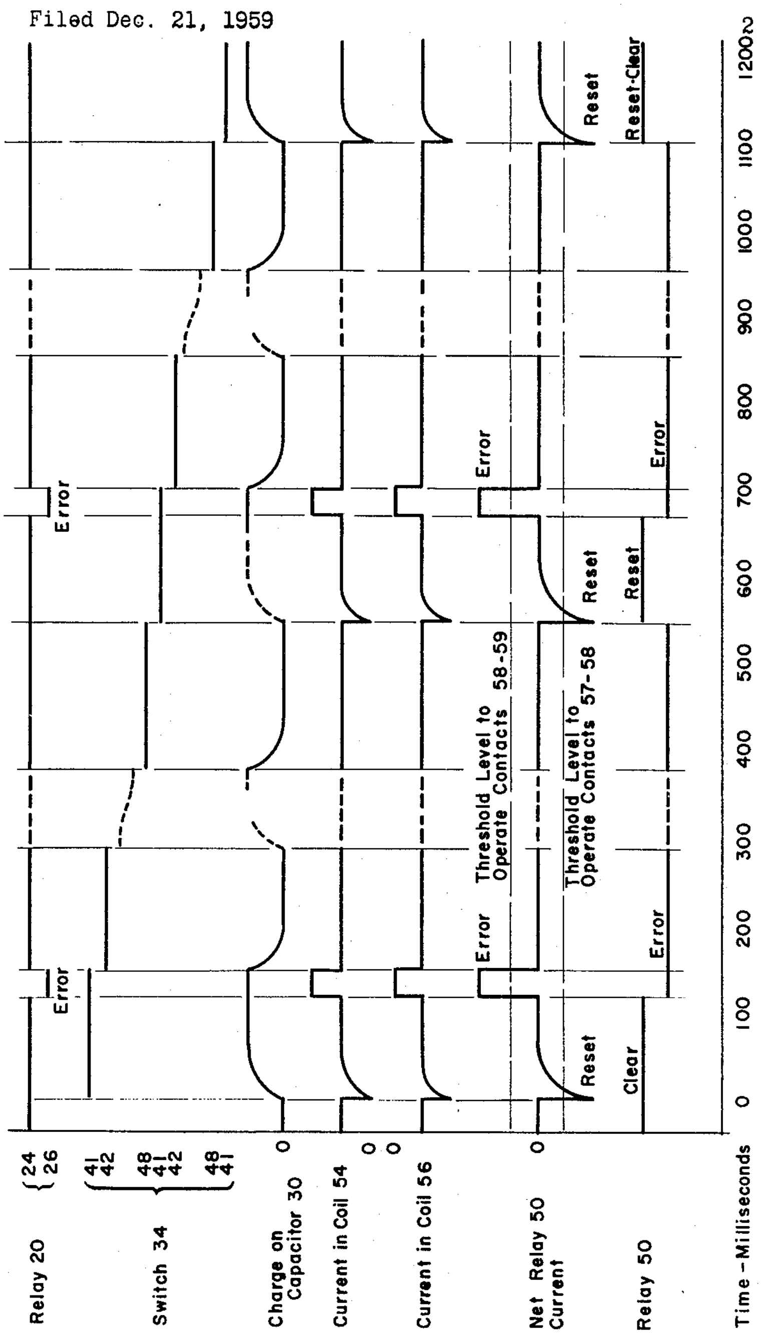

Other objects and many attendant advantages of this invention will be readily appreciated as the same becomes better understood by reference to the following detailed description considered in connection with the accompanying drawings, showing by way of example an embodiment of the invention and wherein:

FIG. 1 is a circuit diagram of the illustrated embodiment according to the present invention, and FIG. 2 is a timing analysis of the FIG. 1 circuit.

Referring to the illustrated embodiment, a remote multiple position switch 10 successively places signals which may be in error on armature 12 of the switch. Switch 10 is at a point which is remote from the apparatus of the present invention and is employed to deliver successive signals to line 14 coupled to the local error detector and delay circuit 16. Error detector and delay 16 operates in any well-recognized manner, for example detecting errors by the parity method and causing an output to occur on line 18 some time thereafter. In the illustrated embodiment, this time delay is 120 milliseconds. The error indicating signal on line 18 is sufficient to operate relay 20 attracting armature 22 from contact 24 to contact 26, thereby placing armature 22 in series with dropping resistance 28 and the source of voltage $V_1$. In an unoperated position, relay armature 22 is coupled to ground through capacitor 30 by means of normally closed contact 24.

Armature 22 is connected to armature 32 of multiple contact switch 34, which operates synchronously with the remote sampling switch 10 as indicated by dash line 36 and is controlled by any convenient synchronizer means 37. Switch 34 is a rotary switch which periodically and successively connects armature 32 to contacts 41, 42, 43, 44, 47 and 48. After contact 48 is reached armature 32 returns immediately to contact 41 and the cycle repeats. Any number of contacts may be provided in accordance with the number of sequentially received periodic error signals on line 14. Switch 34 has twice as many contacts as there are error signal times, odd numbered contacts being connected to operate two-position relay storage devices hereinafter described and intermediate even numbered contacts being returned to ground through resistance 36.

Polarized relay 50 is one such storage device and has windings 54 and 56 wound as shown to cause the polarized relay to operate its armature 58 into either of its two holding positions. The direction of current through windings 54 and 56 determines which way the armature is operated. In the circuit as shown, energizing winding 54 pulls armature 58 towards contact 59, while energization of winding 56 will return the relay to its re-set position shown on the diagram, that is, with armature 58 connecting to contact 57.

In like manner polarized relay 60 has a pair of operating windings 64 and 66 for causing armature 68 to operate in opposite directions. Winding 64, in the circuit shown, when energized will cause armature 68 to connect with contact 69 while energization of winding 64 will reset armature 68 to contact 67.

Polarized relay 70 has a pair of windings 74 and 76, winding 74 being disposed to operate armature 78 toward contact 79 while operation of winding 76 resets armature 78 to contact 77.

Windings 54, 64 and 74 are grounded as shown while windings 56, 66 and 76 are connected to a source of operating voltage for the respective relays, the remaining winding leads being respectively joined at points 52, 62 and 72. Point 52 is connected to contact 41 on switch 34. Similar junctions 62 and 72 on relays 60 and 70 are connected respectively to contacts 43 and 47 on switch 34.

In the illustrated embodiment, signals in which errors are to be detected occur during successive 150 millisecond periods, with intervening 150 millisecond periods during which no signals are received. Switch 34 is synchronized with the input signal pattern so that armature 32 remains connected to particular contacts for 150 millisecond periods. If an error signal is received on line 14 during a first error period, the error will be detected and delayed by error detector and delay circuit 16, producing an output concluding some time before armature 32 moves from error terminal 41 to intermediate terminal 42. In the illustrated embodiment the error signal is delayed 120 milliseconds. The voltage on line 18 is sufficient to operate relay 20 closing armature 22 to contact 26 thereof. The voltage $V_1$ will then cause a current flow through resistor 28, contacts 26 and 22, and through armature 32 of switch 34 to contact 41 thereof, to terminal 52 of polarized relay 50. The voltage at point 52 is equal to $V_1$ dropped slightly by resistor 28 and is sufficient to energize coil 54 causing armature 58 to be attracted towards contact 59. The polarized relay will then remain in this position until the relay is reoperated.

Armature 32 of rotary switch 34 next moves to contact 42 thereof during the intermediate, no-signal, period, providing a resistance connection to ground through resistor 36. Since the operation of switch 34 is timed to take place after the conclusion of the error signal upon line 18, armature 22 of relay 20 has now returned to contact 24 thereof. Therefore, any charge on capacitor 30 is dissipated in resistor 36 by means of the serial arrangement of contacts 24 and 22, armature 32, and contact 42 on switch 34. At a time 150 milliseconds later, armature 32 of switch 34 connects with contact 43 thereof. Now a second error signal may be received, but is delayed a period of time, for example, 120 milliseconds by error detection and delay circuit 16. During this 120 millisecond period, relay 60 is operated into the re-set position as follows: Voltage $V_1$ causes a serial flow through winding 66, contact 43 on switch 34, armature 32 on switch 34, armature 22 on relay 20, contact 24 on relay 20, and capacitor 30. Capacitor 30 charges quite rapidly, but the charging current is sufficient to re-set relay 60 into the position shown, that is, with armature 68 closed to contact 67 thereof.

Now some period later after the capacitor 30 has charged and the relay has been reset into the position as shown, a delayed error will appear on line 18 closing armature 22 of relay 20 against contact 26 thereof. A current will then flow from $V_1$ through resistor 28, contacts 26 and 22, armature 32 of switch 34, contact 43 of switch 34, and winding 64 of relay 60 to ground. The latter current will close armature 68 against contact 69, indicating an error condition. Armature 32 of switch 34 will then move on to contact 44 to discharge capacitor 30 through resistor 36. Any number of contacts may be employed with rotary switch 34, as indicated by the break in the numbering of contacts below contact 44 on the drawing.

Proceeding on to further contact 47 on switch 34 representing a later error position, relay 70 is re-set by winding 76 thereof by means of a current from $V_1$ through winding 76, contact 47, armature 32, relay contacts 22 and 24, and capacitor 30. Subsequently, 120 microseconds later, line 18 may indicate an error signal which closes armature 22 of relay 20 against contact 26. Voltage $V_1$ then causes a current to flow through resistor 28, contacts 26 and 22, armature 32, contact 47, and operating coil 74 of relay 70, thereby closing contact 78 against contact 79 and thus storing an error in relay 70. Progression of armature 32 to contact 48 and release of armature 22 of relay 20 against contact 24 discharges capacitor 30 through resistor 36.

After contact 48, armature 32 of rotary switch 34 returns to contact 41 thereof. At that time relay 50 is re-set by a current proceeding from $V_1$ through winding 56, contacts 41 and 32 of switch 34, contacts 22 and 24 of relay 20, and capacitor 30. At a time 120 milliseconds later, any error present on line 14 for this period, will operate armature 22 of relay 20 against contact 26 thereof completing the aforementioned circuit through winding 54 of relay 50 to reclose relay 50 into an error storing position.

It is thus seen that the rotary switch 34 has made a full cycle from relay 50 to the other relays and back to relay 50. Each time the armature 32 connects to relay 50, the relay is first re-set to the no error position and then reoperated to the error storing position provided an error occurs at the time period which relay 50 is made to represent. As the rotary switch proceeds on to contacts connected to other relays, relay 50 still stores the error information by maintaining its operated condition until rotary switch 34 returns to relay 50. At intermediate positions of the stepping switch 34 the capacitor 30 is discharged so that the capacitor may temporarily re-set the next storage relay.

In FIG. 2, a timing analysis illustrates typical operation of the circuit of FIG. 1 wherein the sampling time base is 150 milliseconds.

In the example shown in FIG. 2, the case is presented where an error pulse appears at the first error position (represented by the time that armature 32 of switch 34 is at contact 41 thereof) on each of two switch revolutions, but does not appear on the third revolution. At time zero switch 34 is in position 41. The current flowing through relay contacts 22 and 24 to charge capacitor 30 re-sets relay 50 by means of energizing coil 56 thereof. As capacitor 30 charges, the current in coil 56 reduces to an amount insufficient to operate the relay; however, the charging current has already been sufficient to operate the relay into the re-set position, that is, with armature 58 against contact 57. At the delayed error time, here taken to be 120 milliseconds later, an error indicated on line 18 operates relay 20 so that voltage $V_1$ is presented to coil 54 of relay 50. This error indication is sufficient to operate armature 58 of the relay against contact 59 thereof.

The first dashed portion of the time chart, FIG. 2, represents the period when the rotary switch is going through other intermediate contacts before returning to contact 41. At the time when the armature 32 of rotary switch 34 returns to contact 41 thereof, relay 50 will be re-set in the same manner, and if an error is still indicated on line 18 relay 50 will be re-operated. The second dashed curve section separates the second and third coincidence of armature 32 and contact 41 on switch 34. The third resetting of armature 58 results in the armature remaining in the re-set position since no error signal is received after the first 120 milliseconds. Since no error has occurred relay 50 will be left for the next cycle of switch 34 in the re-set position indicating no error in the first time position.

It is thus seen that a plurality of sequential errors received on line 14 and detected and delayed by means 16 are caused to be stored on a plurality of relays until the next time period for the error signal is reached; at that time the relay storing a particular error is re-set and then caused to re-operate if an error remains. The plurality of relays are thus employed to give a permanent indication of the error condition of sequential signals.

Obviously many modifications and variations of the present invention are possible in the light of the above teachings. It is therefore to be understood that within the scope of the appended claims the invention may be practiced otherwise than as specifically described.

What is claimed is:

1. In a self-clearing, error discriminating and storage system, an error detecting and delaying means, a first relay means responsive to said detecting means, charge storage means connectable to said first relay means, a voltage tap also connectable to said first relay means, a switch tap connecting said first relay means to any of a plurality of rotary switch contacts, a multiple contact rotary switch means having a predetermined number of storage contacts according to the desired number of error periods to be registered and also having a signal clearing contact between each of said storage contacts, means connecting said signal clearing contacts to ground through a load, a plurality of signal storage means connected to each of said storage contacts and arranged so that a signal is stored when received from said error detector and so that the storage means is automatically reset during the delay time produced by said error detector.

2. In a self-clearing error discriminating and storage system according to claim 1 wherein said signal storage means comprises a storing armature, a reset contact and a recording contact, both connectable to said storing armature, and a switch means having a voltage responsive means to move said armature to reset and having a signal responsive means to move said armature to record position, and whereby said charge storage means is connected through said first relay and a storage contact to the reset potential of each signal storage means so that current will flow to move said storing armature into reset position.

3. In a self-clearing, error discriminating and storage system according to claim 2 wherein said switch means comprises a polarized relay having a first winding connected to ground for moving said storing armature to reset position when said tap first touches said storage contact and while the signal is delayed from the error detector means, and having a second winding oppositely wound and parallel to said first winding and connected to a voltage source for moving said storing armature oppositely into record position in response to the delayed signal from said error detector.

References Cited in the file of this patent

UNITED STATES PATENTS

| | | |
|---|---|---|
| 1,705,833 | Nelson | Mar. 19, 1929 |
| 1,772,167 | Taylor | Aug. 5, 1930 |
| 2,807,009 | Rowell | Sept. 17, 1957 |

FOREIGN PATENTS

| | | |
|---|---|---|
| 473,086 | Canada | Apr. 24, 1951 |